(12) United States Patent
Chen et al.

(10) Patent No.: US 6,410,142 B1
(45) Date of Patent: Jun. 25, 2002

(54) SPS NANOCOMPOSITE AND PROCESSES FOR PRODUCING THE SAME

(75) Inventors: In-Mau Chen, Chu-Pang; Wen-Faa Kuo, Hsinchu; Hsien-Yin Tsai, Tainan; Jeng-Yue Wu, Taichung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 26 days.

(21) Appl. No.: 09/617,128

(22) Filed: Jul. 14, 2000

(30) Foreign Application Priority Data

May 9, 2000 (TW) ........................................ 89108801 A

(51) Int. Cl.⁷ ................................................ B32B 5/16
(52) U.S. Cl. ..................... 428/402; 428/403; 428/404; 428/522; 523/202; 523/209; 523/210; 523/211
(58) Field of Search ................................ 428/402, 403, 428/404, 522; 523/209, 211, 210, 202

(56) References Cited

U.S. PATENT DOCUMENTS 6,017,632 A * 1/2000 Pinnavaia et al. .......... 428/403
6,057,035 A * 5/2000 Singh .......................... 428/403

* cited by examiner

Primary Examiner—Leszek Kiliman
(74) Attorney, Agent, or Firm—Sughrue Mion, PLLC

(57) ABSTRACT

Disclosed is a sPS nanocomposite with improved crystallization properties and higher mechanical strength, which comprises a polymer matrix containing syndiotactic polystyrene (sPS), and a layered clay material uniformly dispersed in the polymer matrix. The layered clay material is intercalated with an organic onium cation and optionally along with a polymer or oligomer which is compatible or partially compatible with sPS. The interlayer distances of the layered clay material are at least 20 Å. The sPS nanocomposite can be prepared by ways of in-situ polymerization, melt blending, or solution blending. According to the invention, the layered clay material dispersed in the sPS matrix not only leads to higher mechanical strength, but also, surprisingly, improves crystallization properties of sPS.

31 Claims, No Drawings

SPS NANOCOMPOSITE AND PROCESSES FOR PRODUCING THE SAME

BACKGROUND OF THE INVENTION

1. Field of the Invention

The present invention relates in general to a new nanocomposite material. More particularly, it relates to syndiotactic polystyrene (sPS) nanocomposites and processes for producing the same.

2. Description of the Related Arts

Nanocomposites are a new class of material containing minerals that exhibit ultra-fine phase dimensions, typically in the range 1–100 nm. Experimental work on these minerals has generally shown that virtually all types and classes of nanocomposites lead to new and improved properties such as increased stiffness, strength, and heat resistance, and decreased moisture absorption, flammability, and permeability, when compared to their micro- and macro-composite counterparts. Specifically, commercially available Nylon 6/clay nanocomposite shows that the polymer matrix having layered clay minerals dispersed therein exhibits improved mechanical strength, heat distortion temperature (HDT), and impermeability to gas and water.

Syndiotactic polystyrene (sPS) was developed in 1986 by Ishihara using a metallocene catalyst composition. The syndiotactic polystyrene has a syndiotacticity of at least 90% and exhibits a very high melting point (270° C.). In addition, the syndiotactic polystyrene has the properties of low dielectric constant, low specific gravity, and excellent chemical resistance, which make it a suitable candidate for many engineering plastics applications.

In spite of a variety of sPS composites have been developed in order to broaden the range of its applications, those containing layered silicates dispersed at a nanoscale (i.e., sPS/clay nanocomposites) have never been reported. The present invention aims to provide such sPS nanocomposites.

As widely known to the art, the syndiotactic polystyrene suffers from the problem of having relatively lower crystallization rate, thus causing molding difficulties. A known method to raise the crystallization rate involves the use of nucleating agents and crystallizing aids. However, the improvement is not sufficient enough for some practical uses.

In consequence, it would be a significant improvement in the state of the art if sPS composites with improved mechanical and other properties could be prepared at a faster crystallization rate.

SUMMARY OF THE INVENTION

An object of the invention is to provide a new nanocomposite material and processes for producing the same.

Another object of the invention is to provide a sPS nanocomposite with high mechanical strength and a process for producing the same.

A further object of the invention is to provide a sPS nanocomposite with improved crystallization characteristics and a process for producing the same.

To attain the above objects, a layered clay material is modified with an organic onium cation by ion exchange and optionally together with a oligomer or polymer which is compatible or partially compatible with sPS, and the modified clay material is dispersed in a styrene monomer to undergo in-situ polymerization by using a metallocene catalyst, thus obtaining the modified clay material uniformly dispersed in sPS polymer matrix. Alternatively, the sPS nanocomposite can be obtained by directly blending (e.g., solution blending, melt blending) the modified clay material with a syndiotactic polystyrene. X-ray diffraction (XRD) analysis of the composite material thus obtained indicates delamination of the clay material in nano-scale.

In the nanocomposite of the present invention, the nano-dispersed clay material not only imparts mechanical reinforcement to the polymer matrix, but also, surprisingly, improves the crystallization properties of sPS significantly.

DETAILED DESCRIPTION OF THE INVENTION

The sPS/clay nanocomposite of this invention comprises a polymer matrix containing syndiotactic polystyrene (sPS), and a layered clay material uniformly dispersed in the polymer matrix, said layered clay material being intercalated with an organic onium cation, and the interlayer distances of said layered clay material being at least 20 Å. Optionally, the layered clay material may be intercalated with a polymer or oligomer which is compatible or partially compatible with sPS. The amount of the optionally intercalated polymer or oligomer is preferably in the range from 0.5 to 50 parts by weight per 100 parts by weight of the clay material.

The polymer matrix in the composite material of this invention is a resin containing sPS, namely, a sPS or a mixture thereof with other polymers. The molecular weight of the sPS to be used in the present invention is not specifically limited, but is preferably within the range from about of 15,000 to 800,000 in terms of weight-average molecular weight ($M_w$).

The layers of clay material in the composite material of this invention, which are intended to impart the polymeric material with high mechanical strength, have a thickness of about 7 to 12 Å. Also, it has been found that the nano-dispersed clay material unexpectedly increases the crystallization rate and crystallization temperature of sPS. The greater the proportion of the clay material in the sPS matrix, the more marked the effects achieved.

The amount of the clay material dispersed in the composite material of this invention is preferably in the range from about 0.1 to 40 parts by weight per 100 parts by weight of the polymer matrix. If this amount is less than 0.1 parts, a sufficient reinforcing effect cannot be expected. If the amount exceeds 40 parts, on the other hand, the resulting product is powdery interlayer compound which cannot be used as moldings. In addition, it is also preferable that the composite material of this invention be such that the interlayer distance is at least 30 Å. The greater the interlayer distance is, the better the mechanical strength will be.

Next, the process for manufacturing composite material of this invention is described below.

The first step is to bring a cation-type surfactant into contact with a clay material having a cation-exchange capacity of about 50 to 200 meq/100 g, thereby adsorbing the surfactant on the clay material. This can be accomplished by immersing the clay material in an aqueous solution containing the surfactant, followed by washing the treated clay material with water to remove excess ions, thereby effecting ion-exchange operation.

The clay material used in this invention can be any clay material (both natural and synthesized) having a cation exchange capacity of about 50 to 200 meq/100 g. Typical examples include smectite clays (e.g., montmorillonite, saponite, beidellite, nontronite, hectorite, and stevensite), vermiculite, halloysite, sericite, and mica. With a clay material whose cation-exchange capacity exceeds 200 meg/100 g, its interlayer bonding force is too strong to give intended composite materials of this invention. If the capacity is less than 50 meq/100 g, on the other hand, ion exchange or adsorption of surfactant will not be sufficient, making it difficult to produce composite materials as intended by this invention.

The cation-type surfactant serves to expand the interlayer distance in a clay material, thus facilitating the formation of polymer between the silicate layers. The surfactants used in the present invention are organic compounds containing onium ions which are capable of forming a firm chemical bond with silicates through ion-exchange reaction. Particularly preferred surfactants are ammonium salts containing at least 12 carbon atoms, such as n-hexadecyl trimethylammonium bromide and cetyl pyridinium chloride.

Optionally, the surface modified clay material may be intercalated with a polymer or oligomer, which is compatible or partially compatible with sPS, as a subsequent modification. For example, this can be accomplished by admixing the modified clay material with a styrene monomer or 2,6-xylenol monomer, and polymerizing the monomer to obtain atactic polystyrene (aPS) or poly(2,6-dimethyl-1,4-phenylenen oxide) (PPO) intercalated in the modified clay material, respectively.

The next step in the process of this invention is to mix a styrene monomer with the modified clay material, which may be intercalated with a polymer or oligomer other than sPS and is compatible or partially compatible with sPS, and to polymerize the mixture by using a catalyst composition containing metallocene, thereby giving an intended composite material of this invention. Typically, the polymerization of syndiotactic polystyrene requires a catalyst composition containing a metallocene catalyst and a methyl aluminoxane (MAO) co-catalyst. The concerted action of the metallocene and the methyl aluminoxane allows syndiotactic polystyrene to be polymerized. Suitable polymerization time varies with the surfactant adopted, but is usually in the range from 15 to 40 minutes for reaching a weight-average molecular weight of 15,000 to 800,000.

Alternatively, the composite material of this invention can be obtained by directly blending the modified clay material with a syndiotactic polystyrene, wherein the clay material may be intercalated with a polymer or oligomer which is compatible or partially compatible with sPS. The blending can be accomplished by a variety of methods which are well-known in the art, such as melt blending or solution blending. In general, the blending can be accomplished by melt blending in a closed system. For example, this can be carried out in a single- or multi-screw extruder, a Banbury mill, or a kneader at a temperature sufficient to cause the polymer blend to melt flow. According to this invention, the blending is preferably carried out at a temperature ranging from about 290° to 310° C. Solution blending can be carried out by dispersing the modified clay in an organic solution of sPS, and thoroughly mixing the dispersion. The intended composite material of this invention can be therefore obtained after evaporation of the organic solvent.

The composite materials obtained according to the procedure detailed above may be directly injection-molded, extrusion-molded or compression-molded, or may be mixed with other types of polymers before molding.

In addition, the composite materials of the present invention may be further incorporated with the usual additives in the usual quantities according to the intended use, for example, 5 to 100 parts by weight of an impact modifier, 2 to 50 parts by weight of a flame retardant, 1 to 10 parts by weight of a compatilizer, or 0.01 to 5 parts by weight of an antioxidant.

Without intending to limit it in any manner, the present invention will be further illustrated by the following examples.

EXAMPLE 1

To a solution containing 1.68 g (4.6 mmol) of n-hexadecyl trimethylammonium bromide in 150 ml of water, 5 g of montmorillonite powder was added, and the suspension was then stirred for 6 hours to effect ion exchange. After filtration, the solid matters collected were washed with water and dried, affording montmorillonite exchanged with n-hexadecyl trimethylammonium ions.

The ion-exchanged montmorillonite was admixed with 35 g of styrene monomer in 100 ml of acetonitrile, and then 0.125 g of benzoyl peroxide was added to effect polymerization. After the polymerization was continued for 8 hours, excess methanol was added to quench the reaction. The precipitated powders were filtered, washed with water and dried, giving montmorillonite intercalated with atactic polystyrene.

1 g of the aPS-intercalated montmorillonite thus obtained was charged in a three-neck reactor and dried at 70° C. in vacuum. Next, 350 ml of dehydrated styrene monomer was added to the reactor with thorough mixing, and 1 ml of triisobutyl aluminum and 2 ml of methylaluminoxane were then added, followed by stirring for 20 minutes. The reactor was purged with some hydrogen until the inner pressure of the reactor reached 0.2 kgf/cm$^2$. Following this, 1 ml of metallocene catalyst was added to effect polymerization.

The polymerization was allowed to proceed for 30 minutes before terminated by excess methanol. The composite material thus obtained was purified by using methylethyl ketone and subjected to DSC (differential scanning calorimeter) analysis to measure the crystallization properties. The results are summarized in Table 1. XRD analysis of the composite material shows the absence of diffraction peaks between 2°–8° (2θ), which indicates delamination of the montmorillonite into nanoscale has taken place.

EXAMPLE 2

The same procedure as in Example 1 was repeated, except that the amount of the modified montmorillonite in the final step was changed to 0.3 g. The results are also shown in Table 1.

Table 1 also shows the test results of two comparative samples (C1 and C2): a sPS neat resin prepared by the same polymerization procedure as described in Example 1, except that no clay material was added (C1); and a commercial sPS which contains nucleating agent (C2).

TABLE 1

|  | EX. 1 | EX. 2 | C1 | C2 |
|---|---|---|---|---|
| $T_{cc}$ (° C.) | 253.1 | 245.3 | 236.9 | 242.1 |
| $T_{1/2}$ @ 140° C. (min) | 0.120 | 0.207 | 0.624 | 0.337 |

EXAMPLE 3

100 parts by weight of sPS powders were mixed with 3 parts by weight of the modified clay obtained in Example 1. The mixture was melt blended in a kneader at 275–300° C. for at least 5 minutes, giving a composite material.

XRD analysis of the composite material shows the absence of diffraction peaks between 2°–8° (2θ), which indicates delamination of the montmorillonite into nanoscale has taken place. The composite material was also subjected to DSC analysis and a tensile test. The results are summarized in Table 2.

Table 2 also shows the test results of two comparative samples (C3 and C4): the sPS neat resin used in this example (C3); and a sPS/glass fiber composite which is prepared by the same procedure as described in Example 3, except that the clay material was replaced by 10 parts by weight of 5 mm-long glass fiber (C4).

TABLE 2

|  | EX. 3 | C3 | C4 |
| --- | --- | --- | --- |
| $T_{cc}$ (° C.) | 260.2 | 247.3 | — |
| $T_{1/2}$ @ 248° C. (min) | Not found* | 2.35 | — |
| Tensile Modulus (Kgf/cm$^2$) | 15,612 | 11,319 | 15,108 |

*Too fast to detect

EXAMPLE 4

In a reaction vessel containing trichloro benzene was added 5 wt % of sPS powders. The reaction vessel was heated to 150° C. to completely dissolve the sPS powders. Subsequently, 0.5 parts by weight (based on 100 parts by weight of the sPS powders) of the modified clay obtained in Example 1 was added to the solution, followed by thorough mixing. Excess methanol was added to precipitate the reaction mixture. The precipitated particles were filtered and dried in an oven, giving a composite material.

XRD analysis of the composite material indicates delamination of the montmorillonite into nanoscale. The results of DSC analysis are summarized in Table 3.

Table 3 also shows the test result of a comparative samples (C5), which is the sPS neat resin used in this example.

TABLE 3

|  | EX. 4 | C5 |
| --- | --- | --- |
| $T_{cc}$ (° C.) | 239 | 234 |
| $T_{1/2}$ @ 248° C. (min) | 2.16 | 6.12 |

It is apparent from Tables 1–3 that the composite materials of this invention have higher crystallization temperatures and faster crystallization rates than the comparative materials. Moreover, the greater the proportion of the clay material in the composite, the more marked the effects were achieved. These features make the composite materials of this invention outstandingly suitable for molding operation. For example, the utilization of such composite material results in shorter thermoforming cycle times due to the faster rate of crystallization which is attained. In addition, as can be seen from Table 2, the nano-dispersed clay material imparted the polymeric material with higher mechanical strength.

While the invention has been particularly shown and described with reference to the preferred embodiment thereof, it will be understood by those skilled in the art that various changes in form and details may be made without departing from the spirit and scope of the invention.

What is claimed is:

1. A syndiotactic polystyrene/clay nanocomposite comprising:

a polymer matrix comprising syndiotactic polystyrene (sPS); and a layered clay material uniformly dispersed in the polymer matrix, said layered clay material being intercalated with an organic onium cation, and the interlayer distances of said layered clay material being at least 20Å.

2. The nanocomposite as claimed in claim 1, wherein the amount of said layered clay material is about 0.1 to 40 parts by weight per 100 parts by weight of said polymer matrix.

3. The nanocomposite as claimed in claim 1, wherein said layered clay mineral has a cation-exchange capacity ranging from about 50 to 200 meq/100 g.

4. The nanocomposite as claimed in claim 1, wherein said layered clay mineral is selected from the group consisting of smectite clay, vermiculite, halloysite, sericite, and mica.

5. The nanocomposite as claimed in claim 4, wherein said smectite clay is selected from the group consisting of montmorillonite, saponite, beidellite, nontronite, hectorite, and stevensite.

6. The nanocomposite as claimed in claim 1, wherein said organic onium cation is derived from an ammonium salt.

7. The nanocomposite as claimed in claim 6, wherein said ammonium salt is cetyl pyridinium chloride.

8. The nanocomposite as claimed in claim 6, wherein said ammonium salt is n-Hexadecyl trimethylammonium bromide.

9. The nanocomposite as claimed in claim 1, wherein said layered clay material is further intercalated with a polymer or oligomer which is compatible or partially compatible with syndiotactic polystyrene.

10. The nanocomposite as claimed in claim 1, wherein said layered clay material is further intercalated with atactic polystyrene (aPS) or poly(2,6-dimethyl-1,4-phenylene oxide).

11. The nanocomposite as claimed in claim 1, wherein said syndiotactic polystyrene has a weight average molecular weight ($M_w$) ranging from about 15,000 to 800,000.

12. The nanocomposite as claimed in claim 1, further comprising an additive selected from the group consisting of impact modifiers, flame retardants, compatilizers, and antioxidants.

13. A process for producing a syndiotactic polystyrene/clay nanocomposite, comprising the steps of:

(a) modifying a layered clay material by ion exchange with an organic onium cation; and (b) dispersing the modified clay material in a styrene monomer, and in-situ polymerizing the styrene monomer in the presence of a catalyst to obtain a composite having said modified clay material uniformly dispersed in a syndiotactic polystyrene matrix.

14. The process as claimed in claim 13, wherein said layered clay mineral has a cation-exchange capacity ranging from about 50 to 200 meq/100 g.

15. The process as claimed in claim 13, wherein said organic onium cation is derived from an ammonium salt.

16. The process as claimed in claim 15, wherein said ammonium salt is cetyl pyridinium chloride.

17. The process as claimed in claim 15, wherein said ammonium salt is n-Hexadecyl trimethylammonium bromide.

18. The process as claimed in claim 13, wherein step (a) further comprises the steps of:

admixing the modified clay material with a styrene monomer or 2,6-xylenol monomer, and polymerizing the monomer to obtain atactic polystyrene or poly(2,6-dimethyl-1,4-phenylenen oxide) intercalated in said modified clay material, respectively.

19. The process as claimed in claim 13, wherein said syndiotactic polystyrene has a weight average molecular weight ($M_w$) ranging from about 15,000 to 800,000.

20. The process as claimed in claim 13, wherein said catalyst comprises a metallocene catalyst and a methyl aluminoxane co-catalyst.

21. The process as claimed in claim 13, wherein step (b) further comprises adding to said composite an additive selected from the group consisting of impact modifiers, flame retardants, compatibilizers, and antioxidants.

22. A process for producing a syndiotactic polystyrene/clay nanocomposite, comprising the steps of:

(a) modifying a layered clay material by ion exchange with an organic onium cation; and (b) blending the modified clay material with a syndiotactic polystyrene to obtain a composite having said modified clay material uniformly dispersed in a syndiotactic polystyrene matrix.

23. The process as claimed in claim 22, wherein said layered clay mineral has a cation-exchange capacity ranging from about 50 to 200 meq/100 g.

24. The process as claimed in claim 22, wherein said organic onium cation is derived from an ammonium salt.

25. The process as claimed in claim 24, wherein said ammonium salt is cetyl pyridinium chloride.

26. The process as claimed in claim 24, wherein said ammonium salt is n-Hexadecyl trimethylammonium bromide.

27. The process as claimed in claim 22, wherein step (a) further comprises the steps of:

admixing the modified clay material with a styrene monomer or 2,6-xylenol monomer, and polymerizing the monomer to obtain atactic polystyrene or poly(2,6-dimethyl-1,4-phenylenen oxide) respectively intercalated in said modified clay material.

28. The process as claimed in claim 22, wherein said syndiotactic polystyrene has a weight average molecular weight ($M_w$) ranging from about 15,000 to 800,000.

29. The process as claimed in claim 22, wherein said blending is accomplished by solution blending.

30. The process as claimed in claim 22, wherein said blending is accomplished by melt blending.

31. The process as claimed in claim 22, wherein step (b) further comprises adding to said composite an additive selected from the group consisting of impact modifiers, flame retardants, compatibilizers, and antioxidants.

* * * * *